Feb. 20, 1923.
S. B. BENNETT ET AL
WINDING REEL
Filed Mar. 31, 1922
1,446,410
2 sheets-sheet 2
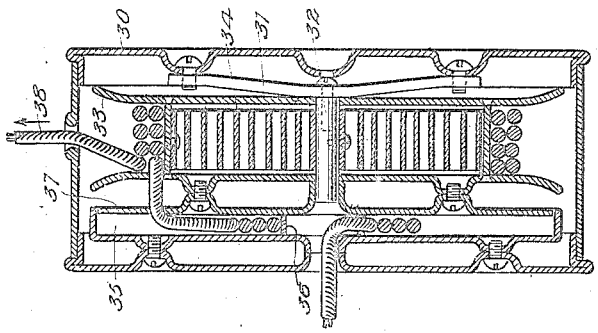
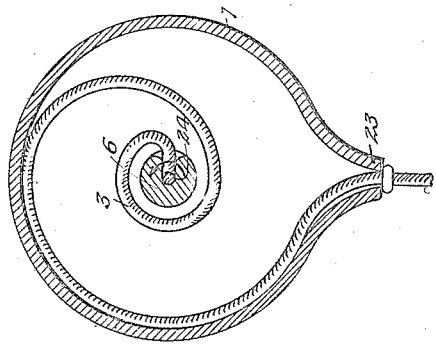
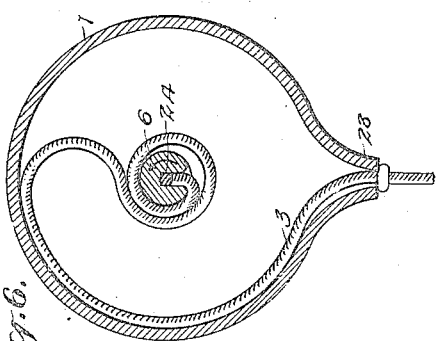
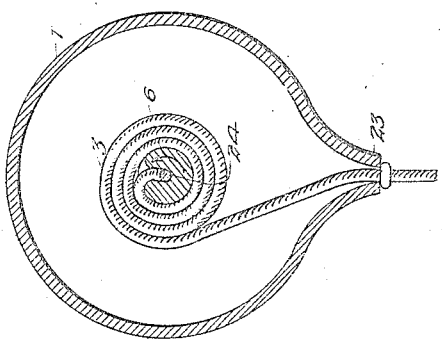
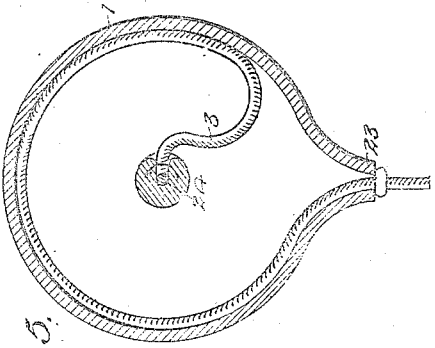
WITNESSES
INVENTORS
S. B. Bennett
D. M. Hudson
BY
ATTORNEYS Patented Feb. 20, 1923.

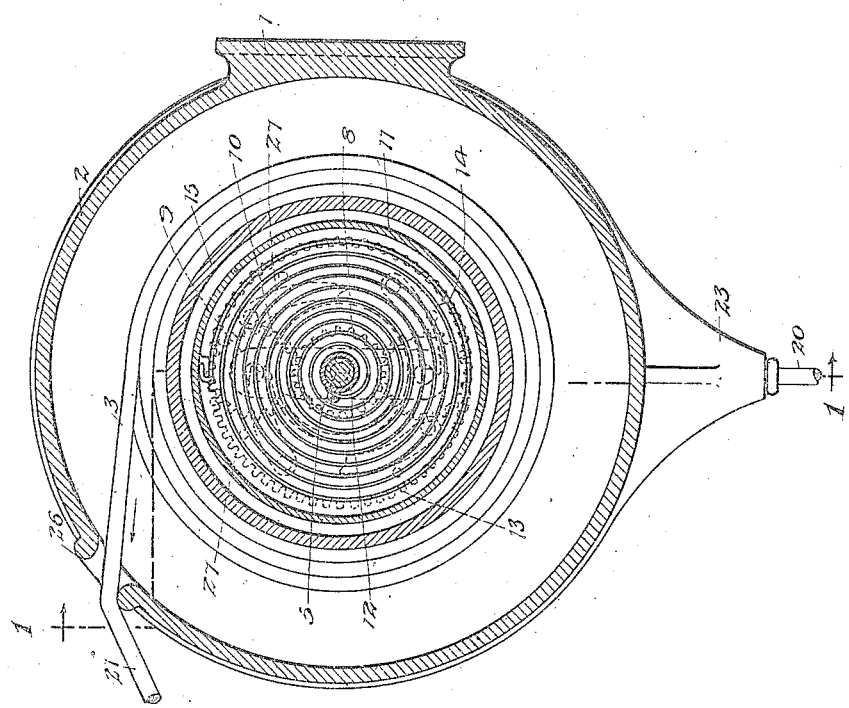

1,446,410

UNITED STATES PATENT OFFICE.

SANDY BOYD BENNETT, OF SAN DIEGO, CALIFORNIA, AND DONALD McCORMICK HUDSON, OF BEND, OREGON.

WINDING REEL.

Application filed March 31, 1922. Serial No. 548,335.

*To all whom it may concern:*

Be it known that we, SANDY B. BENNETT and DONALD MCCORMICK HUDSON, citizens of the United States, and residents, respectively, of San Diego, in the county of San Diego and State of California, and of Bend, in the county of Deschutes and State of Oregon, have invented a new and Improved Winding Reel, of which the following is a full, clear, and exact description.

This invention relates to improvement in winding reels, the principal object of the invention being to provide a reel of this character which may be used for winding the intermediate portion of a line to shorten the length of the line without disturbing fluid flow, or the passage of an electrical current through the line which is wound.

A further object is to provide a reel of this character which can be used for winding air or water hose, electric wire, etc., which can be attached to a telephone to take up slack wire, which may be used in connection with the air hose line of garages, and in fact, a device which will be of universal value for winding power transmitting lines, or any other flexible devices where it is necessary that these lines be wound or shortened without disturbing the two ends of the line.

A still further object is to provide a winding reel of this character, having manifold uses, which will be simple and practical in construction, strong, durable and efficient in use, which will occupy a comparatively small amount of space, and which may be economically manufactured.

With these and other objects in view, the invention consists in certain novel features of construction and combinations and arrangements of parts as will be more fully hereinafter described and pointed out in the claims.

In the accompanying drawings:—
Figure 1 is a view in transverse section through our improved winding device;

Figure 2 is a view in longitudinal section therethrough;

Figures 3, 4, 5 and 6 are similar views in section showing the successive positions assumed by the surplus line on the hub as the main line is unwound from the reel; and Figure 7 is a view in section illustrating a slightly modified form of reel for winding Referring in detail to Figures 1 and 2 of the drawings, we have used the reference numeral 1 to designate a suitable bracket upon which a circular casing 2 is mounted.

The reference numeral 3 indicates a length of line. We have shown this line in the form of a hose or tube to more fully bring out the fact that the line can be wound without disturbing a passage of fluid therethrough and without injuring the tube. The casing is provided at opposite sides with bearing sleeves 4, a spindle 5 being fixed in one of these bearing sleeves. A hub 6 includes an axle 7 journaled in the other bearing sleeve, and a centrally bored gear wheel 8 carried by the hub revolves upon the end of the spindle 5.

An arm 9 fixed to the hub carries at opposite sides a pair of idle pinions 10, meshing with the gear 8 of the spindle. A spring housing 11 is mounted to rotate about a bushing 12 fixed to the spindle 5 and is formed with a ring gear 13, which is engaged by the two pinions 10 to drive the same as the hub 7 is turned. A convolute spring 14 within the spring housing has one end attached to the bushing 12 and its other end attached to the spring housing 11 so that turning of this housing in one direction will wind the spring and increase tension on the same.

A reel 15 is integral with the hub, said reel being provided with side flanges 16 to prevent a line from slipping sidewise thereon. The spool portion 17 of the reel encircles the spring housing 14 so that the winding occupies a comparatively small amount of space, the spring housing and its associated parts being accommodated within the reel.

A partition 18 provided with a central opening for the accommodation of the hub 6 separates the reel from one side wall of the casing 2 and provides a compartment 19 wherein surplus line is adapted to be unwound and rewound as the line on the reel is delivered or pulled out.

It has been heretofore noted that the device was intended for taking up slack in the intermediate portion of a line and for the purposes of describing the operation of the device, it may be assumed that one end 20 of the line is connected to a suitable source of supply, such as an air tank, and the other end 21 of the line leads to the nozzle of the hose. The line is first introduced into the chamber 19 through an opening 22 in a tubular extension 23 of the casing at the lower end of the chamber and is passed through openings 24 and 25 in the hub and reel respectively, wrapped around the reel and delivered through an opening 26 in the casing proper.

In operation, when all the slack has been taken in, there are a plurality of convolutions of line around the reel and also a plurality of convolutions of line around the hub 6 within the chamber 19. When it is desired to extend the line, it is manually pulled through the slot 26 in the casing to any desired length. As the line is dragged from the reel 17, the turning of the hub 6 serves also to unwind the line on the hub in the chamber 19.

It is to be noted, however, with particular reference to Figures 3, 4, 5 and 6, that the unwinding of all of the line from the hub 6 does not check the unwinding from the reel 15. After all of the line has been unwound from the hub, as indicated in Figure 5 of the drawings, continued turning of the hub will start rewinding in the chamber 19 in the opposite direction, so that the line on the hub is both unwound and completely rewound before the unwinding of the line on the reel is checked.

Turning of the hub operates through the speed reducing gears 8, 9 and 10 to turn the spring housing 11 and wind the spring 14. It is to be noted, however, that by virtue of the reducing gears, the speed of turning of the spring housing is considerably less than the speed with which the reel is turned, so that the spring will not be too rapidly wound. Whenever sufficient line has been delivered from the reel, automatic means is provided for preventing the accidental rewinding of the same. This means is in the form of locking dogs 27 pivotally mounted upon the reel 15 and engageable with a lug or projection 28 which extends inwardly from the partition 18. One of the dogs will engage with this lug to prevent accidental rewinding. When, however, it is desired to rewind the line, the line is given a quick jerk throwing the dogs out of engagement with the projection 28 and the action of the spring will quickly rewind the line upon the reel, the dogs being held out of engagement with the lugs by centrifugal force and operating substantially on the principle of the check device used on many well known screen rollers.

Rewinding of the line on the reel will again operate to unwind and rewind the surplus line on the hub. The particular method of winding the line upon the hub and reel absolutely prevents kinking, twisting, or crawling of the line during the unwinding or rewinding operation, so that the chance of fluid flow through the line being interrupted is entirely obviated.

In Figure 7 of the drawings, we have illustrated a slightly modified form of reel which is capable of economical manufacture, and which is primarily intended for winding electric wires or other lines, or flexible devices which are lighter than air hose or fluid supply tubes. This winding device may be installed in the base of an ordinary telephone standard or upon the bell box, or in any other convenient position, or in taking up slack wire on telephone extensions. It also may be mounted upon an electrical appliance such as a vacuum cleaner, adding machine, lamp, chafing dish, spot light, hair clipper, etc., to take up slack therein.

In this form of the device, we illustrate a casing 30. A bracket 31 within the casing provides mounting for a spindle 32 about which a reel 33 is mounted to revolve. The reel serves as the housing for a convolute spring 34 having its ends secured to the spindle and the reel respectively. A chamber 35 for surplus wire is likewise provided in this form of the device, and a hub extension 36 carried by the reel turns in the chamber. The partition 37 defining one wall of the surplus wire chamber instead of being fixed to the housing is carried by the reel and the line 38 instead of being passed through the hub is delivered directly from the chamber to the reel. The operation of the device is substantially the same except that no check is provided, but with both forms of the device, unwinding of the line on the reel serves to unwind and rewind the line on the hub.

Obviously the invention could be carried out in many ways, and various slight changes in structure might be resorted to, hence we do not wish to limit ourselves to the precise details set forth, but shall consider ourselves at liberty to make such slight changes and alterations as fairly fall within the spirit and scope of the appended claims.

In conclusion, we wish to emphasize that the use of the winding reel is practically unlimited, and that it may be used in any connection for winding any type of flexible device.

In the appended claims, the opening clause, mentioning a "device of the kind described," refers always to a device of the following description, to wit, a reeling device for an elongated flexible element, and characterized by the provision of a housing or support adapted to have a fixed location and carrying a plurality of simultaneously rotatable members each for variously winding therein and unwinding therefrom intermediate lengths of such an element, whereby when one of such lengths, hereinafter called the main length, is withdrawn from the housing by being unwound in its entirety from one of the rotatable elements, the other length, hereinafter called the compensating length, is held in its entirety to a coiling and uncoiling movement in an appointed chamber surrounding the second rotatable element. As is well known in the art, a device of such kind has heretofore been proposed, as in the United States Patent to Champion, No. 1,153,029; but the means for confining and guiding the various parts of the element in the reeling device has been limited to an arrangement to give a limited restraint to a third length of the flexible element constituting a connector portion of the element between the main and compensating lengths thereof, and hereinafter called the connector length.

The appended claims, therefore, are in the main directed to the novel features of the present invention involved in the provision of confining and guiding means of the new type shown in the accompanying drawings, that is to say, confining and guiding means not only for all parts of the compensating length but also for all parts of the connector-length, to reduce very greatly the total length of flexible element required relative to any main-length requirement, consonant with a theory of operation mentioned in United States Patent to Craft No. 840,200, to wit, the use of a compensating length to be completely uncoiled and then immediately recoiled during each complete withdrawal of the main length, to the end that a compensating length may be incorporated which is so short that it includes only half as many coils as the main length when the latter is completely reeled up, and so that at the same time there is minimized any chance whatever of kinking or coil-entanglement of the compensating length, or entanglement or interference between the compensating and connector lengths, or any limitation whatsoever in the use of the reeling device, due to the possibility of distorting or twisting the flexible element in any part, in regard to the nature of the flexible element employed, so that even a tube for conducting a fluid or a gas may be used.

We claim:

1. In a device of the kind described, reeling means for a flexible element including the combination of a first rotatable member for the main length of said element, a second rotatable member for the compensating length of said element, and confining and guiding means for said compensating length and the connector length of said element adapted to permit the compensating length to be wound on its rotatable member to the extent of more than two full coils in either direction but adapted always to maintain all the coils of said compensating length in a single plane while always maintaining the connector length removed from said single plane, said confining and guiding means including a retaining means for the compensating length comprising two wall members surrounding the second rotatable member and having opposed plane faces with such faces spaced apart a distance substantially equal to the thickness of said flexible member.

2. In a device of the kind described, reeling means for a flexible element including the combination of a first rotatable member for the main length of said element, a second rotatable member for the compensating length of said element, and confining and guiding means for said compensating length and the connector length of said element adapted to permit the compensating length to be wound on its rotatable member to the extent of more than two full coils in either direction but adapted always to maintain all the coils of said compensating length in a single plane while always maintaining the connector length removed from said single plane, said confining and guiding means including a retaining means for the compensating length comprising two wall members surrounding the second rotatable member and having opposed plane faces with such faces spaced apart a distance substantially equal to the thickness of said flexible element, said confining and guiding means also including a retaining means for the connector length including a recess in the second rotatable member opening into the space between such two walls.

SANDY BOYD BENNETT.
DONALD McCORMICK HUDSON.